Sept. 7, 1926.
C. M. CLEMENT
1,599,114
DETACHABLE TIRE PROTECTOR
Filed Dec. 7, 1925
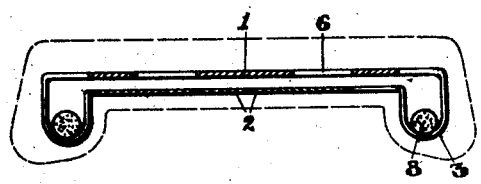
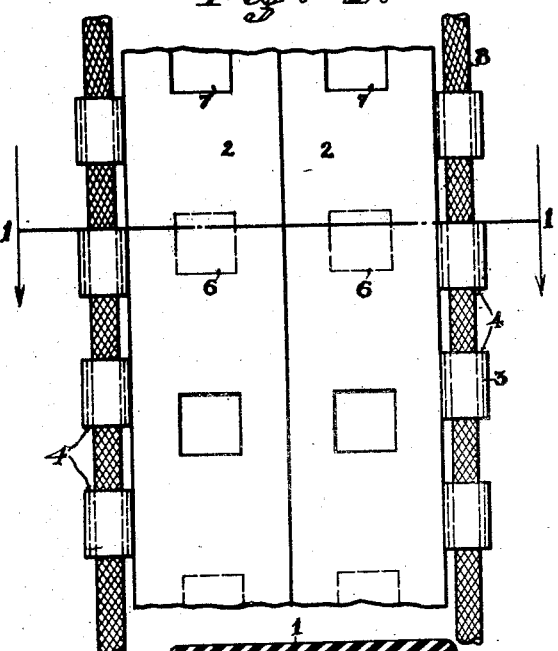
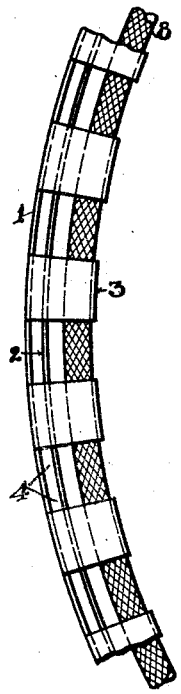
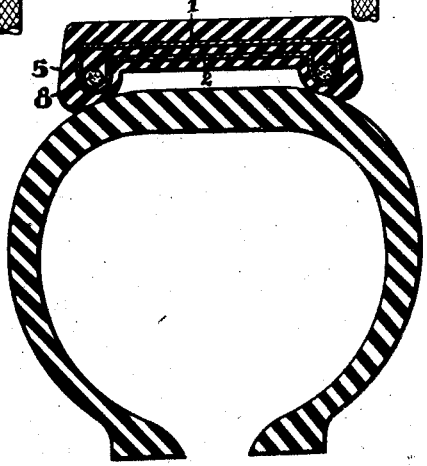
INVENTOR
Charles M Clement
BY
J.E.Trabucco
ATTORNEY Patented Sept. 7, 1926.

1,599,114

UNITED STATES PATENT OFFICE.

CHARLES M. CLEMENT, OF SAN RAFAEL, CALIFORNIA.

DETACHABLE TIRE PROTECTOR.

Application filed December 7, 1925. Serial No. 73,713.

This invention relates to detachable tire protectors of the type adapted to be used on pneumatic tires, and has for its principal object to provide an armor protector for tires which may be easily applied thereto and removed therefrom.

A further object of this invention is to provide a detachable protector for pneumatic tires, which when placed over the tire, prevents the same from being punctured and worn.

A further object of this invention is to provide a tire protector of the type adapted to be easily applied over the tread of a pneumatic tire without the use of additional means for attaching it thereon.

My invention consists in the novel features of construction hereinafter described, illustrated in the accompanying drawings, and particularly pointed out in the appended claims.

In the said drawings:

Fig. 1 is a sectional view of the metallic encircling band taken on the line 1—1 of Fig. 2;

Fig. 2 is a bottom view of the metallic encircling band;

Fig. 3 is a side view of the same; and

Fig. 4 is a sectional view of the tire protector applied to a pnuematic tire.

Referring to the drawings, the numeral 1 represents the body portion of a metallic band, constructed from sheet metal or other suitable material, having its edges 2 turned under and extending beneath but separated from the body portion 1. The edges 2 are adapted to meet beneath the central part of the body portion 1 and may be joined together by solder or other suitable means. The body portion 1 together with its turned under edges 2 comprise an encircling band adapted to extend around a pneumatic tire.

The turned under edges 2 are so shaped and constructed as to provide downwardly projecting parts 3 which extend circumferentially around and beneath the edges and serve as a suitable means for maintaining the band 1 together with the other parts comprising the tire protector, in their proper positions on the pneumatic tire.

The projecting parts 3 are provided with slots or cut out portions 4 which serve as a means for securely holding a resilient material 5 on the body portion 1 and the turned under edges 2.

The body portion 1 is provided therein with a plurality of holes 6, and the turned under edges 2 are also provided with a plurality of similar holes 7 which are located approximately midway between the holes 6.

Located inside the projecting parts 3 are a pair of encircling cables or wires 8 which serve as additional means for keeping the various parts of the protector in their proper positions on the pneumatic tire.

The resilient material 5 when it is vulcanized on the metallic parts of the tire protector, is located entirely around the metallic band and between the body portion 1 and the turned under edges 2. The said resilient substance being located between the body portion 1 and the turned under edges 2 serves as a means for making the tire protector more resilient and noiseless. When applied to the metallic band the resilient material 5 becomes located between the body portion 1 and the turned under edges 2, inside the projecting parts 3, inside slots 4, around the cables 8, inside the holes 6 and 7 and entirely around the various metallic parts comprising the tire protector.

The entire protector may be put on a pneumatic tire by deflating the same and placing the protector over the tread; then by inflation the tire casing will be forced firmly against the inside surface of the resilient material 5, thereby causing the protector to be firmly held on the tread of the pneumatic tire.

Although I have shown but one form of my improved tire protector, it is evident the same may be constructed in a manner different than the form shown and described herein. I therefore do not desire to be limited to the exact construction herein shown, it being understood that certain changes may be made which are within the scope of the appended claims.

What I claim is:

1. A detachable tire protector comprising an encircling band having its edges turned under and extending beneath but separated from the the body portion of band and provided with a plurality of holes located in the turned under edges and in the body portion of the band, a plurality of encircling cables located in the turned under edges of the band, and a resilient material located between the turned under edges of the band and the body portion thereof, inside the said holes and over the turned under edges and the body portion of the band.

2. A detachable tire protector comprising an encircling band having its edges turned under and extending beneath but separated from the body portion of the band and provided with a plurality of slots located in the edges of the band and a plurality of holes located in the body portion of the band and in the turned under edges, and a resilient material located between the turned under edges and the body portion of the band, inside the said holes and said slots, and around the band and turned under edges.

CHARLES M. CLEMENT.